United States Patent

Friden

Patent Number: 6,056,217
Date of Patent: May 2, 2000

[54] MULTIPLE ROTOR PEPPER MILL

[76] Inventor: James L. Friden, 7015 Quail Run Rd., Fort Jones, Calif. 96032

[21] Appl. No.: 09/371,123

[22] Filed: Aug. 10, 1999

[51] Int. Cl.[7] .................................................. A47J 42/06
[52] U.S. Cl. ........................................ 241/135; 241/169.1
[58] Field of Search ................................ 241/169.1, 135, 241/146

[56] References Cited

U.S. PATENT DOCUMENTS

| | | | |
|---|---|---|---|
| 2,795,382 | 6/1957 | Francesch | 241/169.1 |
| 4,591,104 | 5/1986 | Bounds | 241/169.1 |
| 4,685,625 | 8/1987 | Mazza | 241/169.1 |
| 4,709,865 | 12/1987 | Bounds | 241/169.1 |
| 5,022,591 | 6/1991 | Sanders | 241/169.1 |
| 5,088,652 | 2/1992 | Chen | 241/169.1 |
| 5,685,501 | 11/1997 | Wagner | 241/169.1 |
| 5,897,067 | 4/1999 | Tardif et al. | 241/169.1 |

FOREIGN PATENT DOCUMENTS

| | | | |
|---|---|---|---|
| 278234 | 8/1988 | European Pat. Off. | 241/169.1 |
| 932505 | 7/1963 | United Kingdom | 241/169.1 |
| 2183173 | 6/1987 | United Kingdom | 241/169.1 |

*Primary Examiner*—Mark Rosenbaum
*Attorney, Agent, or Firm*—Peter Gibson

[57] ABSTRACT

A hand held rotary pepper mill possessing several grinding rotors gravity fed from a single supply hopper enables an increased grinding rate. A rotor shaft couples each grinding rotor to one of several spur gears all driven by a single drive gear which is driven by an electric motor through reduction gears, planetary or otherwise. A rechargeable battery and a docking station possessing a transformer, A.C. plug, and electrical contacts is suggested. A power switch possessing a spring biased default 'off' position, manually depressed 'on' position, and 'continuous on' positions is recommended. The supply hopper has a radially displaceable cover which may be spring loaded closed with a spring biased dog holding the cover open. Adjustment of grind may be facilitated by vertically displaceable spring biased grinding stators opposed to the grinding rotors. Opposed circumferentially inclined surfaces may be used for continuous grind selection locked with a toggle clamp tightened cincture. A threaded compression rod and mating adjustment knob possessing radial stiles opposed to radial grooves on the underside of the horizontal plate is alternatively recommended for providing a grind adjustment selection which is resistant to drifting.

20 Claims, 6 Drawing Sheets

MULTIPLE ROTOR PEPPER MILL

BACKGROUND OF THE INVENTION

1. Field of the Invention

The present invention relates generally to solid material comminution, more particularly to a hand supported rotary comminutor with cooperating commininuting surfaces, and specifically to hand held mills for grinding spice, particularly peppercorns.

2. General Background

Hand held rotary mills are commonly utilized for comminution of whole grains of pepper, i.e. peppercorns. While commonly available in a ground state it is generally preferred that pepper be freshly ground, i.e. comminuted from whole grains, in order to obtain a flavor which is considered far superior to already ground pepper. Another advantage of freshly ground pepper is the capability of selecting the relative fineness or coarseness of the grind of pepper.

Hence while many spices are utilized during cooking, i.e. preparation of food for human consumption, in accordance with quantities established by a recipe and/or the experience, knowledge, and judgement of the cook or chef, i.e. the person preparing the food, both the amount and grind quality of pepper, particularly, is most commonly left to be determined by the diner, i.e. the consumer of the prepared food, immediately prior to consumption. Salt is also typically available for addition in accordance with the taste of the diner but proper preparation typically requires the use of salt in accordance with a recipe and the experience, knowledge, and judgement of the chef or cook. Pepper, alternatively, is typically added just prior to consumption and is, moreover, preferably ground to a degree of fineness according to the taste of the diner.

For all of these reasons it is common to grind pepper, particularly, immediately prior to consumption of a meal with the use of a pepper mill which is characterized by manual rotation of one of two cooperating comminuting surfaces, i.e. grinding surfaces. The peppercorns are gravity fed from a hopper type supply contained within the mill and the fineness of the grind is determined by adjustment of the space between the two grinding surfaces.

One grinding surface is fixed within a plane and the other is rotated by the application of torque upon a vertical shaft. The torque is transmitted by means of a pair of opposed flats upon the shaft engaged by a rotor with a correspondingly shaped central slot therethrough possessing two opposed flats. The rotor is fixed vertically with respect to the shaft and the spacing between the grinding surfaces adjusted with vertical displacement of the shaft by means of threading upon the top end of the same engaged by a nut. The rotor is disposed below the fixed grinding surface and the nut generally is located above the top portion or head of the mill which is rotationally displaceable with respect to the lower body of the mill which contains a supply of peppercorns within a hopper. Loosening of the nut therefore increases the spacing between the grinding surfaces, thereby effecting a coarser grind, and tightening of the nut decreases said spacing, thereby effecting a finer grind.

Since operation of the mill requires rotation of the head with which the adjustment nut is typically in contact the grind selected is commonly affected by usage; the grind typically becoming finer over time as the rotation of the head in operation is clockwise and both the nut and the threading upon the top end of the shaft invariably possess right handed threading. This unfortunate characteristic, along with all of the other specifics mentioned above are, of course, applicable to what is regarded as the most commonly known type of pepper mill. There are, moreover, several variations upon this most common and basic construction but these variations are considered to be largely ancillary to the fundamentals described. Perhaps the most significant of such variations is the use of a crank between the nut and the head of the mill which not only provides additional leverage in operation but permits continuous revolution of the hand in operation as opposed to the repeated cycle of grasping, turning, releasing and turning back of the hand in order to rotate the head of the mill.

The use of a crank, which is generally perpendicular to the shaft and possesses an upright handle which is rotationally pivoted in connection to the distal end of the crank in order to permit grasping of the same during revolution, is considered to possess one substantial shortcoming. Because the revolution of the handle about the axis defined by the shaft is within a plane the hand effecting said revolution must be maintained within said plane and therefore the entire arm, from the shoulder down, must be moved in a coordinated manner which is considered far more difficult than the repeated cycle of grasping, turning, releasing and turning back of one hand which motion requires only reciprocal twisting of the forearm. The operation of a cranked mill is hence considered far more difficult than operation of the basic mill earlier described, especially with regard to maintaining a stable vertical disposition of the mill and accurate dispersion of the ground pepper which aspect is considered significant. It is considered a common practice in restaurants, particularly, to utilize rather lengthy mills of the conventional type described above in order to more easily dispense pepper upon a diner's meal with accuracy. Cranked mills are considered, therefore, to be unusual for good reason though the crank permits continuous operation which increases the rate of grinding in comparison with the conventional hand held rotary mill construction which operation requires repetitive turning of the head of the mill with one hand while holding the mill with the other.

The rate at which a mill grinds pepper is considered to be quite significant to a restauranteur, caterer, or other professional purveyor of prepared food because, simply put, time is money. Another reason relatively large pepper mills are commonly utilized in restaurants is that the capacity is enlarged and hence the frequency of required peppercorn replenishment is reduced. Larger mills are also less likely to be lost to theft or misplacement which is considered a common problem in the often hectic operation of restaurant kitchens. One wishes neither to waste time looking for a pepper mill nor to expend more than the minimum time necessary to provide freshly ground pepper in either the preparation of food or in seasoning of the same to a diner's taste. It is also considered that certain dishes require a large amount of ground pepper for proper preparation. Peppered beef steak, for example, properly requires a veritable coating with freshly ground pepper and the time spent in grinding pepper in the preparation of a number of such dishes is considered to be significant indeed.

In addition to the time lost in operation of a conventional pepper mill, which is considered to be most significant to the concerns addressed by the present invention, there are also the ancillary matters of wasting time looking for a pepper mill, the relative difficulty of grinding, and the rather more complex matter regarding the adjustment of the grind, particularly with regard to the gradual drifting of the same toward a finer grind as a result of operation as described above which, incidentally, exacerbates the loss of time as a finer grind requires more time to dispense than a coarser grind for the same amount of pepper. Four salient aspects are hence recognized as foci of the present discussion: (1) rate of grind; (2) ease of operation; (3) locatability of the mill and; (4) adjustment of the grind which is further noted to encompass (a) resistance to unintended change; as well as: (b) quickness, (c) ease, and (d) accuracy, of effecting the desired quality of grind in adjustment.

It is considered that the diameter of a rotor utilized in grinding pepper is restricted by the fact that a rotary mill dispenses in a ring with a vacant center and that the mill will lose accuracy if the diameter is too large. For this reason increasing the diameter of the rotary grinding surface is not an option. A manual crank enables continuous operation but is considered awkward for the reasons discussed above. It is hence considered that only two means of increasing both the rate of grind and ease of operation are viable: powering the mill or using more than one grinding rotor. The following references accordingly represent the known prior art which disclose use of electrically powered drive, more than one rotor, and a means of adjustment other than threading of the drive shaft.

References Cited

| Patent No. | Inventor | Date | Title |
| --- | --- | --- | --- |
| U.S. 2,795,382 | Francesch | 11 June 1957 | Electric Coffee Mill |
| U.S. 4,591,104 | Bounds | 27 May 1986 | Condiment Mill |
| UK 2 183 173 | Griffen | 3 June 1987 | Condiment Grinder |
| U.S. 4,685,625 | Mazza | 11 Aug 1987 | Grinding Mill |
| U.S. 4,709,865 | Bounds | 1 Dec 1987 | Dual Condiment Mill |
| U.S. 5,022,591 | Sanders | 11 June 1991 | Cordless Pepper Mill |
| U.S. 5,685,501 | Wagner | 11 Nov 1997 | Portable Spice Mill |
| U.S. 5,897,067 | Tardiff et al. | 27 Apr 1999 | Spice/Pepper-Mill Adjustment Mechanism |

Discussion of the References Cited

Francesch discloses a fly cutter type rotary blade driven by an alternating current (A.C.) motor in a hand held coffee mill which is plugged into an ordinary electric outlet in operation. Bounds '104 discloses a dual position adjustment for a manual single rotor hand held mill using a spring which acts upward against the base and downward upon the rotor, the shaft, a handle thus biasing the casing downward which is manually displaced upward from the base to enable rotation ninety degrees for filling the hopper and one hundred eighty degrees to select fine or coarse grinds as effected by four pairs of opposed steps of two different heights. Griffen discloses manual selection means for grinding condiment in either of two adjacent containers each having a vertical shaft grinding tool either engageable by an idler gear vertically displaceable upon a helical grooved shaft to select the drive or use of "dog clutches formed by (opposed) gear pairs".

Mazza discloses a single rotor electric grinding mill comprised of two sections attached bayonet style, i.e. with rotary lugs engaging inclined grooves, which includes rotary adjustment of the grind effected with a ring possessing a spoke fixed to a threaded sleeve mating a threaded shaft. Bounds '865 discloses a double rotor condiment mill selectively driven by manual means through gears operating according to the direction of rotation imparted, specifically utilizing a central drive gear engaging one of two opposed pairs of spur gears on each of two pivoting arms and then the other two spur gears depending on rotational direction. Sanders discloses a rechargeable electric single rotor pepper mill with frusto conical grinding head possessing flat trapezoidal lands and flutes controlled by a switch spring biased in the open state. Recharging is facilitated by a base unit fed by ordinary line A.C.

Wagner discloses an electric spice mill utilizing a grinding wheel with a shaft perpendicular to the drive shaft from the motor intended to be small enough to carry on one's person. The use of a wheel so oriented with an electric motor having fluted teeth pointed in the direction of rotation fed by a hopper is also specifically claimed. Tardiff et alli disclose a grind adjustment for a single rotor manual spice/pepper mill which uses a manually rotatable stepped spacer ring with notched inclined surfaces which acts against the grinding rotor opposedly biased by a coil spring to provide several fixed spacings of the rotor apart from the fixed grinding surface.

Statement of Need

The pertinent prior art, as represented by the references cited above, teaches the use of electricity, A.C., battery, i.e. direct current (D.C.), and rechargeable battery, i.e. A.C. and D.C., to power a pepper mill possessing a single rotor. The use of two rotors, each exclusively associated with one of two different adjacent material supplies and alternately selectable for drive manually, is also taught by said prior art. The use of alternately opposed steps to obtain either a fine or coarse grind and the use of a notched and stepped ring in order to obtain several qualities of grind, fine, medium, and coarse, is also taught.

In address of the limitations to the rate of grinding obtainable with a pepper mill discussed further above it was suggested that powering a mill would overcome the discontinuous operation of a conventional mill and the difficulties associated with a manually cranked mill. It was also noted that the diameter of the rotor utilized in grinding is restricted by the intended use wherein some accuracy regarding the food to be freshly peppered or otherwise spiced with a mill is necessary and the ring pattern of dispersion achieved by a rotary mill is a significant factor. It is observed that this limitation remains in the known prior art. The problems associated with adjustment of grind quality effected with a threaded drive shaft are considered to have been addressed with the provision of two or three discrete steps available for the spacing between the comminuting surfaces.

The limitation upon grinding rate imposed by use of a single rotor dedicated to a single hopper supply remains, in short, and no means for continuous adjustment of grind quality which avoids the shortcomings of a threaded drive shaft is known. A need is hence recognized for a pepper mill which overcomes the limitations imposed by the use of a single rotor dedicated to a given supply hopper and a further need is recognized for continuous adjustment of grind which does not rely upon a threaded drive shaft.

SUMMARY OF THE INVENTION

Objects of the Present Invention

The encompassing object of the principles relating to the present invention is the minimization of time necessary to obtain freshly ground pepper with a hand held mill.

The primary auxiliary object of the principles relating to the present invention is the maximization of the rate of grinding pepper with a hand held mill.

A secondary auxiliary object of the principles relating to the present invention is the provision for substantially continuous adjustment of grind with a hand held mill which is quick, easy, and resistant to unintended change.

Tertiary auxiliary objects of the principles relating to the present invention include maximizing ease of operation and minimization of time lost in locating a hand held mill.

Principles Relating to the Present Invention

It is first suggested that the primary limitation to the rate of grinding pepper with a hand held rotary mill imposed by the ring pattern of dispersion yielded by single rotor for a given supply hopper be overcome with the use of more than one grinding rotor for a single supply hopper. Given a certain maximum area for dispersion necessary to obtainment of the accuracy desired it is considered that the diameter and hence the rate of grinding available to a single ring pattern is limited by this maximum area of dispersion yielding the accuracy desired. The use of more than one grinding rotor, however, will yield a greater density of dispersion within this maximum area of dispersion necessary for the desired accuracy which approach is suggested as fundamental to the principles relating to the present invention. The use of three grinding rotors, each possessing a comparatively small and preferably equal size arranged within the maximum area of dispersion recognized as achieving the accuracy desired and further preferably arranged symmetrically within this area is specifically recommended.

Each such grinding rotor yields a ring pattern possessing a width equivalent to that possessed of a single conventional grinding rotor and a diameter limited to the radius of the area of maximum dispersion demanded by the accuracy desired. A considerable increase in the density of dispersion within this area in comparison with a single rotor is noted. The use of three grinding rotors within the a given maximum diameter for dispersion accuracy, with each possessing a diameter of forty-five percent of that maximum diameter, yields an increase of twenty-eight per cent in comparison with a single grinding rotor possessing one hundred per cent of that maximum diameter. Four rotors fitted within the same maximum diameter, each possessing a diameter of forty per cent of that maximum diameter, yields an increase of thirty-three per cent in comparison with a single grinding rotor with one hundred per cent of that maximum diameter.

In addition to obtaining a considerable increase in density with regard to the grinding area obtained within a given maximum diameter the pattern presented by three or more smaller grinding rotors in comparison with one grinding large rotor is considered superior with regard to yielding a more even distribution within that maximum diameter for dispersion accuracy. This characteristic permits an increase in the maximum diameter for dispersion accuracy as the dispersion pattern is no longer a simple ring. With a single grinding rotor for a given supply hopper the mill is typically inclined in operation which flattens the dispersion pattern into an ellipse which diminishes the otherwise open center. The diameter of the grinding rotor becomes, effectively, the length of the dispersion pattern, actually the major axis of the ellipse, and the width of the dispersion pattern thus achieved is relatively narrow in order to avoid the otherwise hollow center. Using several rotors for a single supply in a pepper mill it is practical to use the mill in a substantially vertical disposition which creates a much larger horizontal dispersion pattern which makes effective use of the much higher rate of grinding available from powering the operation of the mill.

In short, powering the drive of a pepper mill achieves continuous operation, and also permits a greater rotational speed of the grinding rotor utilized. While these two factors may easily double the rate of grinding available from a conventional mill if only a single grinding rotor is used the dispersion pattern, which varies from a relatively open ring to a relatively narrow stripe with the full range of elliptical patterns therebetween available according to the degree of inclination, is relatively awkward with regard to achieving an even distribution over a given area. With several grinding rotors a comparatively even distribution is obtained with a substantially vertical disposition of the mill and covering the same area with the desired level of dispersion is far easier. With powering of the mill the grinding rate is increased tremendously and the more even dispersion pattern generated by the use of multiple grinding rotors enables one to accurately utilize the increased grinding rate.

With regard to the minimization of time lost in locating a pepper mill it suggested that an electrically powered mill further utilize a rechargeable battery and a recharging base which will possess a stationary location to which it may be customary to return the mill after use. With further regard to maximizing ease of operation it is suggested that a three way switch be provided possessing 'Off', 'On', and 'On While Held' positions. It is further specifically suggested that the 'Off' position be that obtained with spring biased release from the 'On While Held' position and that the continuous 'On' position be obtained with displacement of the switch in the 'On While Held' position in a direction substantially perpendicular to the direction of the spring biased release or with further displacement in the same direction. Two types of switches are suggested each enabling these three positions. One is displaceable parallel to the main axis of the mill; the other perpendicular to the same.

With regard to the adjustment of the relative fineness of the grind achieved by the mill either of two different mechanisms are suggested both utilizing spring biasing of grinding stators either away from or toward the grinding rotors. A substantially circular ring, preferably located at the bottom of the mill, may be rotated in either direction to increase the fineness or coarseness of the grind. This adjustment ring effects vertical displacement the grinding stators with opposed circumferentially inclined surfaces acting upon a single horizontal plate to which the stationary grinding surfaces are fixed in a plane and which is perpendicular to a main longitudinal axis of the mill. In this approach the grinding stators are spring biased away from the grinding rotors, preferably with use of at least two leaf springs underneath a substantially horizontal plate to which the grinding stators are fixed. The grinding stators are urged toward the grinding rotors by opposed pairs of circumferentially inclined surfaces rotationally displaced with respect to each other by means of the adjustment ring. A toggle clamp operated cincture connected to an externally protruding adjustment handle is suggested for maintaining the continuously adjustable grind obtained thereby. Unintended drifting of the desired grind adjustment may also be obtained with a locking ring threaded upon the adjustment ring handle and contacting the exterior surface of the lower portion of the mill. It further recommended that the opposed radially inclined surfaces effecting vertical displacement of the horizontal plate be machine ground in order to permit smooth and continuous adjustment.

The second approach spring biases the grinding stators toward the grinding rotors preferably utilizing a coil spring inside the mill acting downward upon the upper surface of a substantially horizontal surface of a plate or other component to which the grinding stators are fixed. A compression rod having a threaded end extending below the grinding stators and centrally disposed with respect to the same is engaged by a mating adjustment knob. Tightening the knob upward decreases the space between the grinding surfaces and loosening the knob downward increases said space. Resistance to accidental displacement of the knob rotationally and the grind selected thereby is provided by congruently opposed projections and depressions upon the opposed knob and stator plate surfaces. Radial stiles and grooves are specifically recommended. The opposed surfaces are spring loaded against each other and good resistance against unintended change in a substantially continuously adjustable the grind is hence enabled with a comparatively simple mechanism.

The grinding rotors are located at the bottom and the rotor shafts extend upward through the supply hopper to the spur gears which are driven by a drive gear which may be directly coupled to a head cap for manual drive or may be coupled to a set of reduction gears, ordinary or planetary, driven by an electric motor preferably located above the reduction gears. A rechargeable battery is preferably located above the motor and possesses external contacts for recharging, preferably in conjunction with a stationary base equipped with an appropriate transformer and A.C. plug. It is further suggested that a lower portion of the mill comprise a single supply hopper and possess a considerably larger width than an upper portion containing the motor, battery, power switch, and reduction gears which portion is intended to be grasped during operation, and that a substantially horizontal and preferably rotationally displaceable spring biased shut supply hopper cover be provided upon a substantially horizontal step which effects the difference between the widths of the upper and lower portions.

| NOMENCLATURE | | | |
|---|---|---|---|
| 10 | mill | 35 | motor |
| 11 | upper portion | 36 | threading |
| 12 | lower portion | 37 | clock spring |
| 13 | grinding stator | 38 | bushing(s) |
| 14 | adjustment ring handle | 40 | partition |
| 15 | power switch | 41 | stator housing |
| 16 | head cap | 42 | upward facing inclined surface(s) |
| 17 | supply hopper cover | 43 | grinding stator (s) |
| 18 | female electrical contacts | 44 | toggle clamp |
| 19 | male electrical contacts | 45 | battery |
| 20 | docking station | 46 | downward facing inclined surface(s) |
| 21 | head cap socket | 47 | leaf spring(s) |
| 22 | base seat | 48 | grind quality adjustment ring |
| 23 | A.C. plug | 50 | thin walled cup |
| 24 | cover handle | 51 | pin |
| 25 | supply hopper | 52 | ball bearing |

-continued

| NOMENCLATURE | | | |
|---|---|---|---|
| 26 | hopper sidewall | 53 | planetary reduction gear |
| 27 | spring loaded pivoted dog | 54 | cincture |
| | | 55 | compression rod |
| 29 | bottom of mill | 56 | grind adjustment knob |
| 30 | rotor shaft | 57 | coil spring |
| 31 | spur gear | 59 | bottom portion cap |
| 32 | drive gear | 60 | radial notches |
| 33 | ordinary reduction gears | 61 | radial stiles |
| 34 | power gear | | |

DETAILED DESCRIPTION OF THE PREFERRED EMBODIMENT

Figure 1:
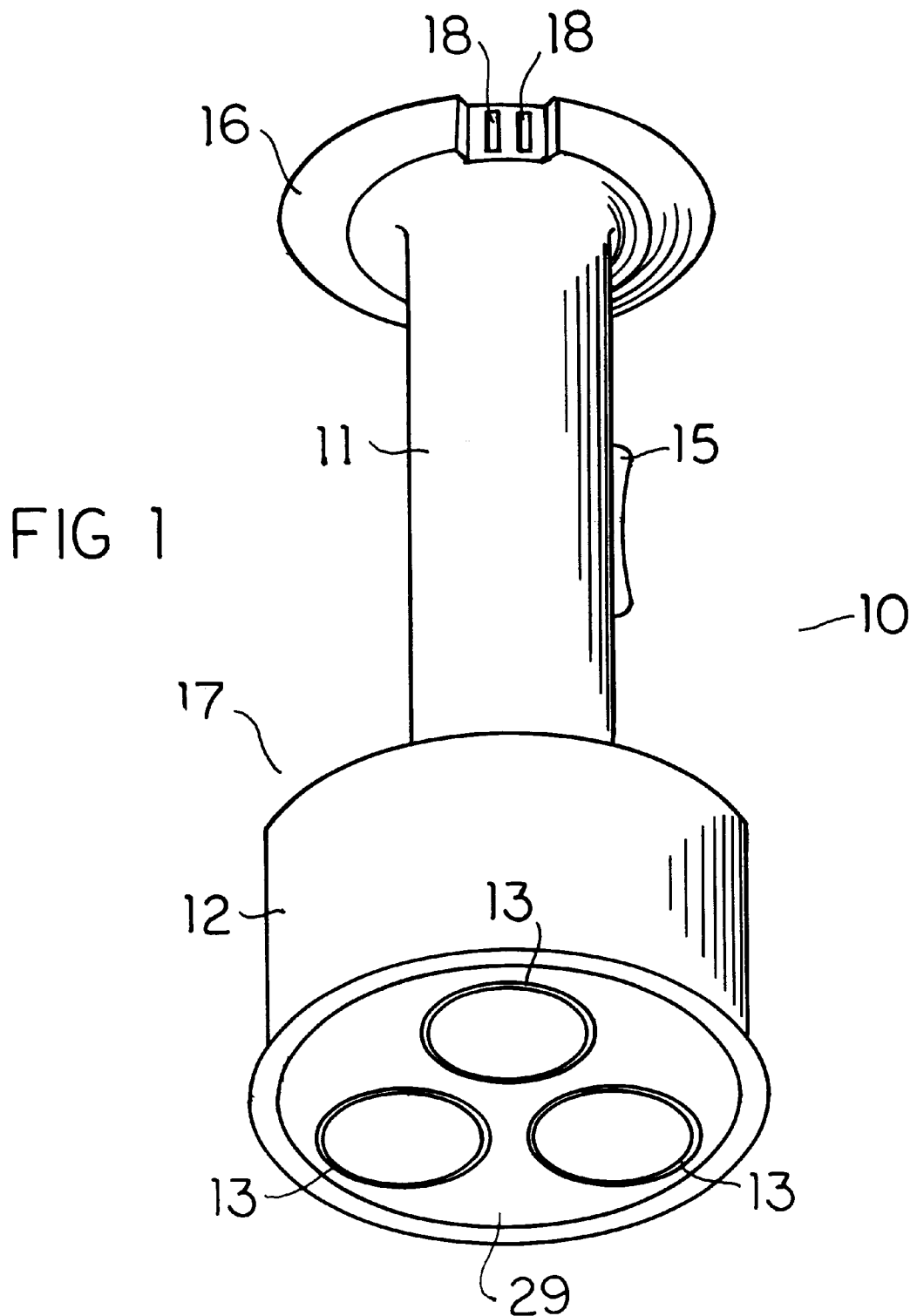
FIG. 1 is an isometric view taken from underneath a pepper mill in preferred accordance with the principles relating to the present invention.
Figure 2:
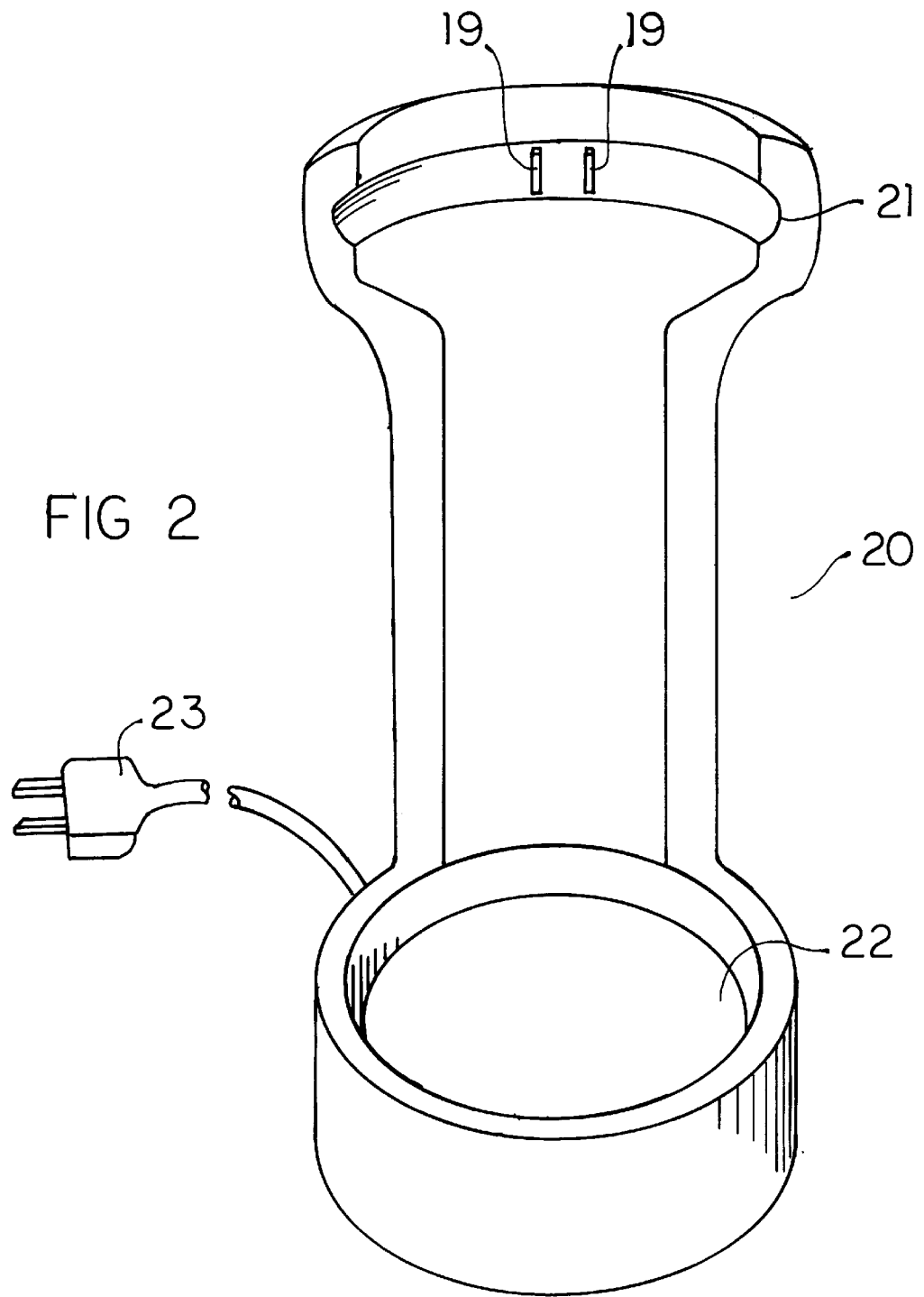
FIG. 2 is an isometric view taken from above a docking station in preferred accordance with the principles relating to the present invention.
Figure 4:
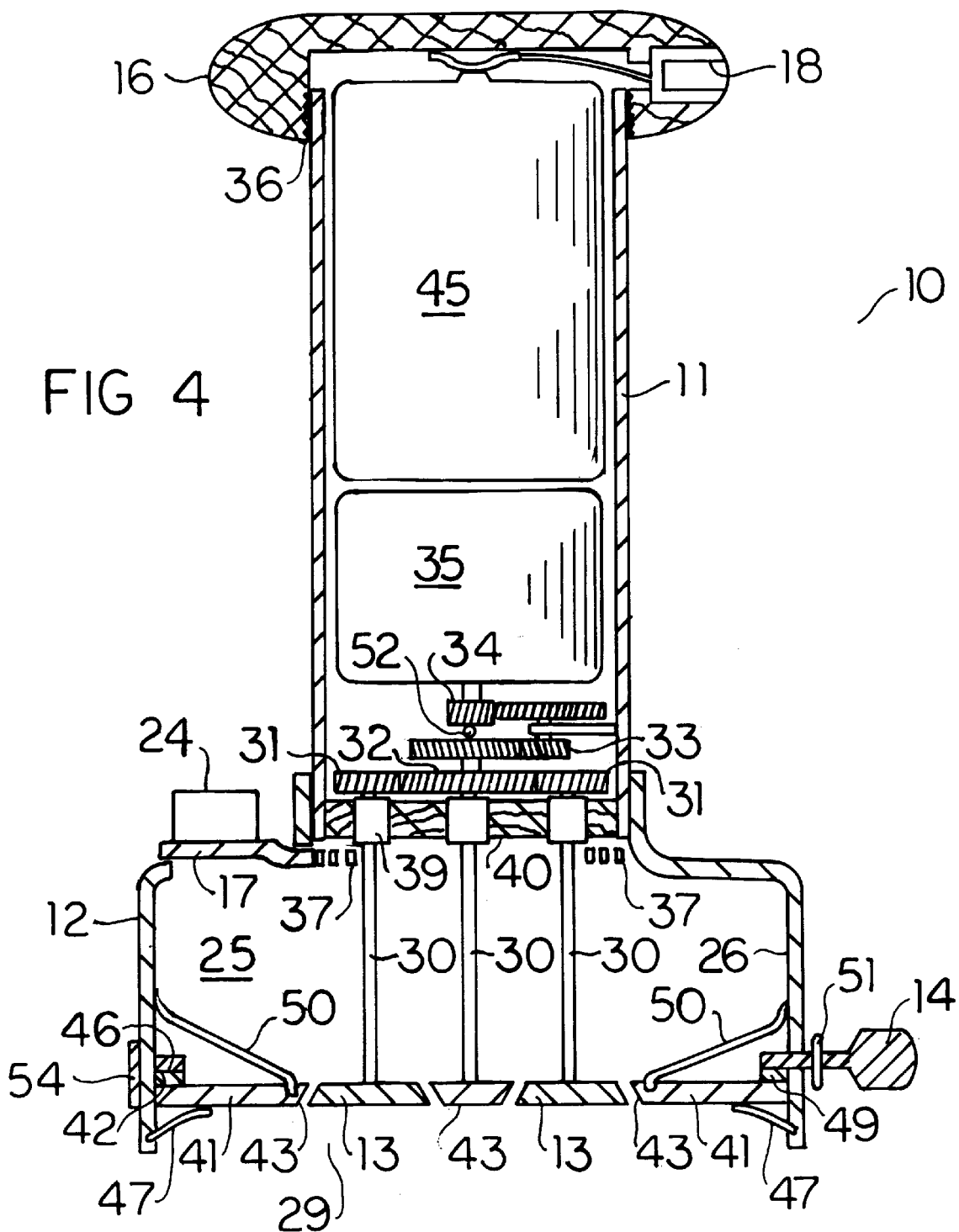
FIG. 4 is a cross sectional view taken through a vertical plane bisecting a pepper mill in preferred accordance with the principles relating to the present invention.

A preferred embodiment of the principles relating to the present invention as depicted in FIG. 1 comprises a hand held pepper mill 10 possessing an upper portion 11, a lower portion 12, three grinding rotors 13, a grind quality adjustment ring handle 14, a power switch 15, a head cap 16, a supply hopper cover 17, a pair of female electrical contacts 18 and a docking base 20 containing an electrical transformer and possessing a congruently disposed pair of male electrical contacts 19 seen protruding from a head cap socket 21 which mate the female electrical contacts 18 upon said mill 10 when the same is located in the docking base 20 with the bottom 29 of the mill 10 placed first in the base seat 22 and the upper portion 11 of the mill 10 displaced backward fitting the head cap 16 into the head cap socket 21. In this position recharging of a battery 45, depicted in FIG. 4, is effected by the transformer in the docking station 20 and the upper portion 11 of the mill 10 below the head cap 16 may be readily grasped, the head cap 16 disengaged and the mill 10 removed for use. The docking station 20 possesses an A.C. plug 23 for a standard A.C. electrical supply outlet and the current obtained therethrough converted into D.C. of appropriate voltage for the battery 45 and electric motor 35 also depicted in FIG. 4.

Figure 3:
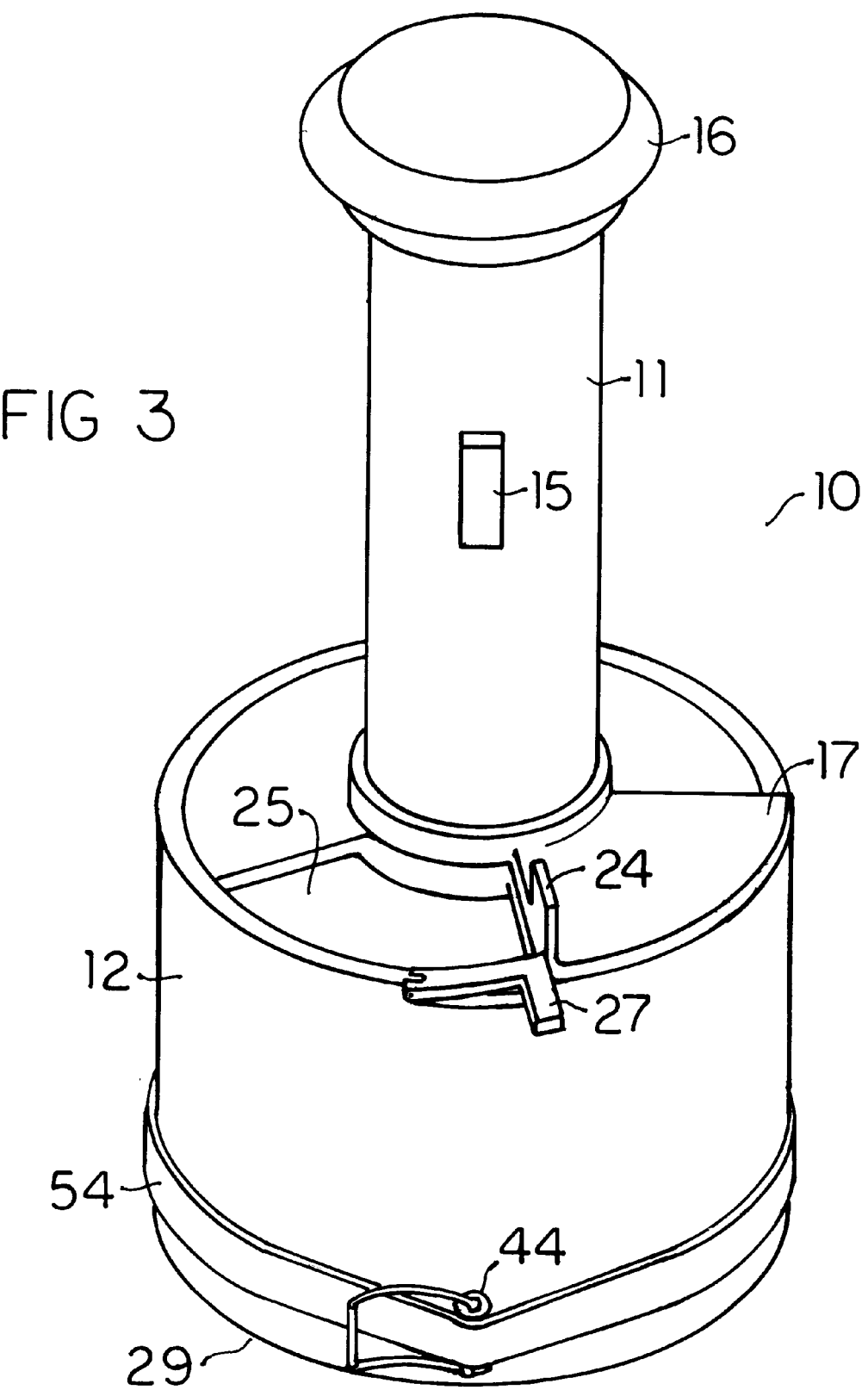
FIG. 3 is an isometric view taken from above a pepper mill in preferred accordance with the principles relating to the present invention.

As seen in FIG. 3 the supply hopper cover 17 may be rotationally displaced manually into an open position revealing the supply hopper 25 with a cover handle 24 projecting upward from the same. Closing is preferably effected with a clock spring 37, depicted in FIG. 4, which imparts a rotational bias against opening of the supply hopper cover 17. A spring loaded pivoted dog 27 as depicted in FIG. 3 is held down by the cover 17 when closed and in opening the same until cleared when it is biased upward by a spring (not shown) behind the rear edge of the cover 17 as shown. The dog 27 depicted further projects outward from the mill 10 so that one may manually depress the same to effect closure of the cover 17. The head cap 16 is preferably removable to facilitate replacement of the battery 45. As seen in FIG. 4 the external top end of the upper portion 11 of the mill 10 and the internal wall surface of the head cap 16 each have threading 36 which mate.

A power switch 15, seen in FIG. 1 as being located upon an exterior lateral surface of the upper portion 11, is preferably also spring biased outward thereby effecting an open circuit. Depressed manually, the power switch 15 preferably effects a closed circuit thereby enabling the supply of power from the battery 45 to the electric motor 35 which action is intended to be obtained with relative ease by the location as a hand grasping the mill 10 by the upper portion 11 which readily positions a finger or two upon the switch 15. A hand held pepper mill 10 in accordance with the principles relating to the present invention possesses a construction, in other words, which preferably permits comfortable operation with a single hand which is opposed to the two hands required for operation of a conventional mill. It is also suggested that the power switch 15 possess a third position, though this is strictly unnecessary, which will effect continuous operation. Manual displacement parallel the exterior surface of the upper portion 11 of the mill 10, i. e. perpendicular to the direction of the spring bias, is suggested in this case for obtaining this 'continuous on' position.

It is further noted that the power switch 15 may, of course, possess only two positions, 'on' and 'off', and that either combination of an 'off' position, which is preferably by default or lack of manual displacement, and one of the two 'on' positions specifically recommended, i. e. 'on while held' or 'continuous on', will be wholly satisfactory. Other variations are readily devised. A toggle switch, for example, may readily possess two or three positions. The toggle switch may be spring biased in the 'off' position and manually depressed on a first side for the 'on while held' position with the 'continuous on' position obtained with depressing the second side. A rotary switch might be used to obtain the equivalent function as well with a bias toward the 'off' position medial to the 'on while held' position to one side and 'continuous on' position on another side. The switch 15 depicted in FIG. 1 is preferred primarily because it facilitates single handed operation as described.

Regardless of the type of switch 15 utilized its purpose is to selectively provide power from the battery 45 to the motor 35 which, being electric, operates at a relatively high speed such as 1800 revolutions per minute. As this rotational speed is much faster than that desired for the grinding rotors 13 it is necessary to provide speed reduction between the two which is effected with either ordinary reduction gears 33 as depicted in FIG. 4 or planetary reduction gears 53 as seen in FIG. 5.

Figure 5:
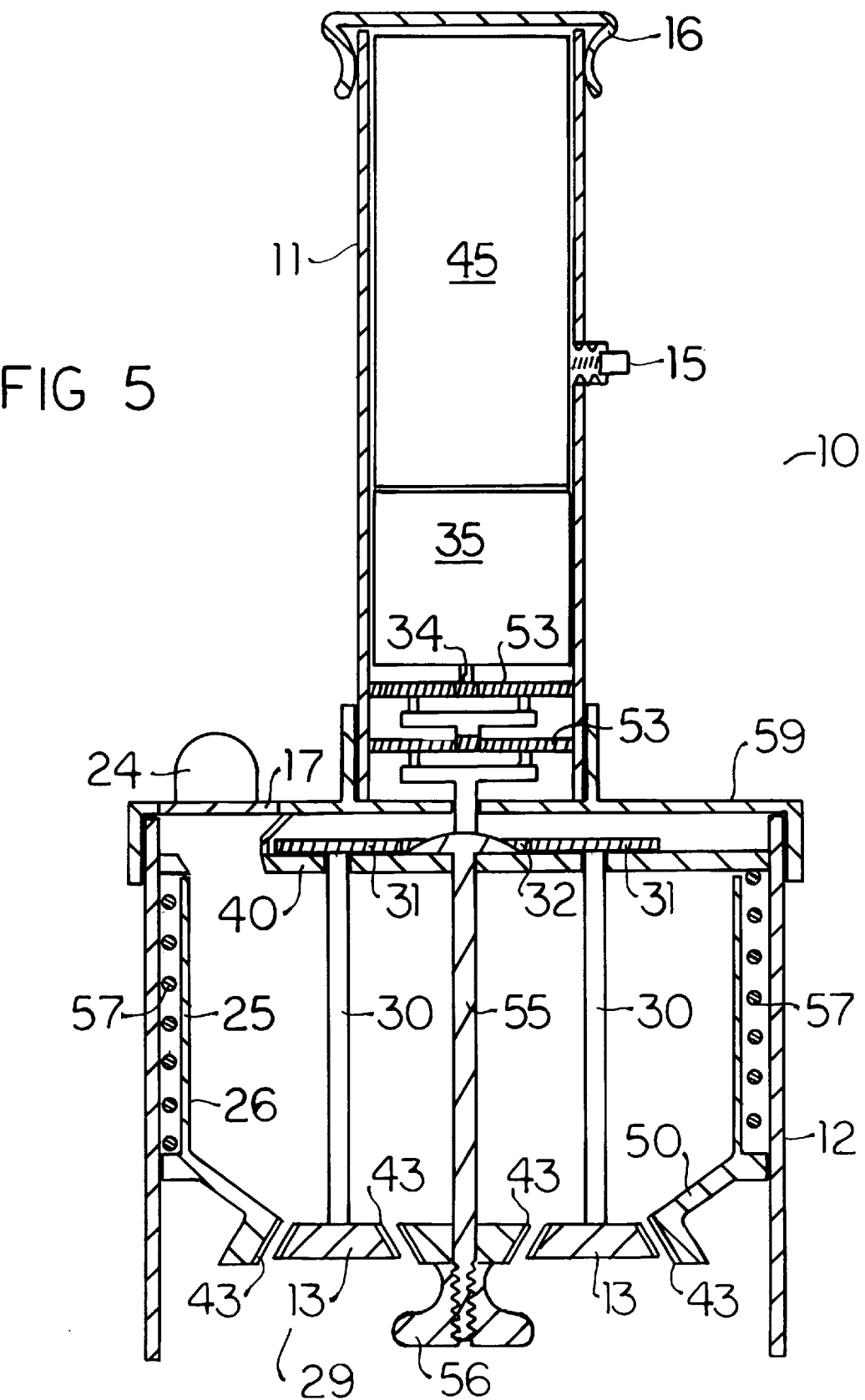
FIG. 5 is a cross sectional view taken through a vertical plane bisecting a pepper mill in preferred accordance with the principles relating to the present invention.

As further seen either FIG. 4 or FIG. 5 a power gear 34 fixed to the output shaft of the motor 35 possesses a relatively small diameter and possesses relatively few teeth in comparison with the first of the larger ordinary reduction gear 33 or planetary reduction gears 53 it engages. The rotational speed of these larger gears is reduced in inverse proportion to the number of teeth it possesses compared with the number of teeth possessed of the power gear 34. A smaller gear is seen below and coupled to the first large gear(s) which possesses the same reduced rotational speed of the first large gear and which engages a large gear of the second set of reduction gears 33 as seen in FIG. 4, or the second set of planetary reduction gears 53 as seen in FIG. 5, which is coupled, in either case, to a drive gear 32 which engages a plurality of spur gears 31 each of which drives a rotor shaft 30 to which a grinding rotor 13 is fixed at the opposed, lower, end.

In other words the reduction gears 33 depicted in FIG. 4 comprise two pairs of large and small gears wherein the large gear is driven by a small gear, hence reducing the rotation speed of the driven pair of gears. With a three to one ratio of teeth between the smaller drive gear and the larger driven gear the rotational speed is reduced to one third the input speed. Done twice, as shown in FIG. 4, the resultant rotational speed of the drive gear 32 driving the spur gears 31 is one ninth the rotational speed of the power gear 34. If the motor 35 operates at 1800 RPM the resultant speed of the drive gear 32 is 200 RPM. This speed, 3.33 revolutions per second, is considered appropriate to the grinding rotors 13. Obviously, greater or lesser speed reduction is readily facilitated if desired, and the reduction gears 33 may be different than that shown in FIG. 4 while obtaining a suitable output speed for the drive gear 32. The planetary reduction gears 53 depicted in FIG. 5 require a cylindrical and splined interior sidewall which is engaged whereby the planetary reduction gears 53 precess about the interior and rotate a plate to which the small gear is centrally fixed but otherwise effect a speed reduction in accordance with the inverse ratio between the larger gears and the coupled small gear as described above with reference to the ordinary reduction gears 33.

Two pairs of coupled large and small gears, as shown in FIG. 4, or two sets of planetary reduction gears 53 as seen in FIG. 5 are preferred because, as clearly seen, this arrangement readily permits alignment of the axis of the drive gear 31 with the axis of the power gear 34 which are both preferably, as shown, coincident with a longitudinal central axis for the pepper mill 10. While this aspect unnecessary to fulfillment of the principles relating to the present invention the symmetry facilitated thereby is considered to be of obvious benefit in design and manufacture of an embodiment in accordance with said principles.

It is necessary to support all gears 31, 32, 33, 34, 53 such that each is substantially fixed within a plane against displacement other than rotational. The power gear 34 is so fixed by the motor 35. The spur gears 31, each coupled to a grinding rotor 13 by a comparatively long rotor shaft 30 in order to facilitate ample space for the supply hopper 25, are shown to be supported by bushings 39 fixed to a partition wall 40 isolating the supply hopper 25 from the reduction gears 33 above. A thin walled cup 50 at the bottom of the supply hopper 25 with inclined walls directs gravity fed supply material to the opposed grinding surfaces possessed by each pair of grinding stator 43 and grinding rotor 13. Adjustment of the quality of the grind is preferably effected with a stator housing 41, which as seen in FIG. 4 is comprised of a flat plate, which has each grinding stator 43 fixedly mounted therein and, in the case depicted in FIG. 4, possesses a plurality of peripheral upward facing circumferentially inclined surfaces 42 which are each opposed to a downward facing circumferentially inclined surface 46 possessed by an adjustment ring 49.

Rotation of the adjustment ring 49, which is facilitated by an adjustment ring handle 14 protruding through a radial slot in the lower portion 12 of the mill 10, in one direction therefore effects a reduction in the space between the grinding stators 43 and the grinding rotors 13, which are vertically fixed, thereby effecting a finer grind. Rotation of the adjustment ring 49 in the opposed direction effects an increase in the space between the grinding stators 43 and the grinding rotors 13 thereby effecting a coarser grind. The horizontal plate comprising the stator housing 41 in this case and the grinding stators 43 fixed thereto are biased upward to maintain the spacing so set between the grinding surfaces with several leaf springs 47 attached to the interior sidewall of the lower portion 12 proximate the bottom end 29 of the mill 10 which act against the bottom face of the plate comprising the stator housing 41 as seen in FIG. 4.

In order to maintain the rotational positioning of the adjustment ring 49, and the grind quality selected thereby, it is suggested that a toggle clamp 44 as shown in FIG. 3 be utilized which tightens a cincture 54 about the exterior surface of the lower portion 12 of the pepper mill 10 when closed. It is further suggested that the horizontal plate comprising the stator housing 41 have a thin walled cup 50 attached at the bottom end thereto as shown in FIG. 4 with an upper end is flush against the interior surface of the sidewall 26 of the bottom portion 12 of the mill 10 to guide the gravity fed pepper and protect the adjustment ring 49 and, most particularly, the opposed pairs of upward and downward facing radially inclined surfaces 42, 46. In the embodiment depicted in FIG. 5 the thin walled cup 50 is shown as integral to the stator housing 41 which construction is readily effected with a casting. The thin walled cup 50 in this case traps a large coil spring 57 acting to bias the stator housing 41 downward. This integral component may readily be replaced by two separate components, a plate comprising the stator housing 41, and a cylindrical section comprising the thin wall cup 50 which construction is considered more economic but less rigid than the casting depicted in FIG. 5.

It is preferred that construction of a pepper mill 10 in accordance with the principles relating to the present invention be conducted largely in metal and avoid the use of plastic reasons of durability. It is accordingly recommended that the upper portion 11 of the mill be made of metal tubing, such as steel, aluminum, or brass. It is suggested that the head cap 16, as depicted in FIG. 4, may be made of wood with an interior threaded 36 cavity mating the threading on the top end of the upper portion 11. The basic shape of the head cap 16 depicted therein may be readily effected upon a lathe and the interior cavity milled out. The female contacts 18 may be press fitted therein and two wires (only one shown) passed through a drilled hole as seen in FIG. 4 for connection to internal electrical contacts with the battery 45. It is also suggested that the docking station 20 may be constructed of wood, plastic, or metal. An A.C. to D.C. transformer, (not shown), along with the necessary wiring is, of course, required of the docking station 20.

Alternatively, and as implied by the construction depicted in FIG. 5, the battery 45 may be readily removable, as enabled either by threading or the use of a formed head cap 16 as depicted in FIG. 5 which simply pulls off, and placed in a recharging unit, (not shown), possessing an A.C. to D.C. transformer similar in function to the docking station 20. In this case it is recommended that at least two batteries 45 be provided so that one may be ready, fully charged, in the recharging unit to substitute for the other when its charge is depleted. It is considered that the advantage obtained is the assurance that a fully charged battery 45 is always available whenever the battery 45 in use is depleted although two batteries 45 are, of course necessary. Another advantage is that standard rechargeable batteries 45 and a standard recharging unit may be utilized rather than a specialized docking station 20.

It is suggested that the bottom portion 12 of the mill 10 be either formed in a suitably malleable metal such as copper, brass, or aluminum as implied by FIG. 4 or constructed from tubular and plate stock as implied in FIGS. 3 & 5. The bottom portion 12 may be interiorly threaded at the top for connection with the upper portion 11 of the mill 10, press fitted, welded or brazed, in which case threading of the bottom end of the upper portion 11 of the mill 10 is obviously unnecessary. It is suggested that the partition wall 40 between the supply hopper 25 and the reduction gears 33 may also be made of wood, as depicted in FIG. 4, or sheet metal stock as depicted in FIG. 5 with apertures drilled therethrough for the bushings 39. The clock spring 37 is attached to the partition wall 40 by inserting an perpendicular end of the same into a small hole as shown in FIG. 4.

The battery 45 and motor 35 are conventional but must be electrically insulated from the upper portion 12 of the mill 10 if the same is metal. A plastic, cork, or paper sleeve (not shown) is suggested. The reduction gears 33, 53 and associated shafts are preferably steel though plastic may readily suffice. It is suggested that the supply hopper cover 17 be either formed from a suitably malleable metal or cut from metal stock and that the spring loaded pivoted dog 27 be made of similar metal with a leaf spring (not shown) attached to the top rim of the lower portion 12 of the mill 10 in a manner similar to the clock spring 37 which method is also suggested for attachment of the leaf springs 47 acting against the bottom surface of the horizontal plate comprising the housing stator 41 in that case which is preferably machined in steel. The grinding rotors 13 and the opposed grinding stators 43 are preferably machined from steel and the grinding surfaces hardened.

The grinding stators 43 may be press fitted into appropriately sized apertures through the housing stator 41. The adjustment ring 49, if utilized, is also preferably machined from steel and in particular the opposed circumferentially inclined surfaces 42, 46 possessed by a horizontal plate comprising the stator housing 41 and the adjustment ring 49 are preferably ground steel. A toggle clamp 44, if utilized, is preferably steel attached to the handle 14 of the adjustment ring 49 with a steel pin 51 which is clearly shown in FIG. 4 and a steel band, preferably stainless, is recommended for a cincture 54 tightened about the lower portion 12 of the mill 10. A circumferential groove of a height slightly larger than the steel band may be cut into the exterior surface of the lower portion 12 of the mill 10 in order to facilitate positioning.

The thin walled cup 50 which provides a lower inclined sidewall 26 for the supply hopper 25 in the case depicted in FIG. 4 is preferably formed from steel and the bottom of the same press fitted in a circular groove cut into the top surface of the horizontal plate comprising the stator housing 41. In the case depicted in FIG. 5 these two components are depicted, as mentioned earlier, as an integral piece which is readily obtained by casting and for which aluminum is recommended. Alternatively, as also earlier mentioned, a tubular metal section and metal plate, preferably steel, may readily be utilized instead of a casting.

The lower portion 12 of the mill 10 depicted in FIG. 5 is simply constructed from a cylindrical section of metal tubing and a bottom portion cap 59 is readily cast, as shown, with an upward flange about the lower end of the upper portion 11 in order to provide a strong juncture between the two. This flange may readily be effected with welding or brazing of a short metal tubular section along with the downward depending flange about the upper end of the lower portion 12 in which case the lower portion cap 59 may readily be cut from a piece of metal sheet stock and casting avoided. Forming the downward depending flange is another option for avoiding casting. The supply hopper cover 17 depicted in FIG. 3 may be readily cast, that depicted in FIG. 4 formed and that depicted in FIG. 5 cut from sheet metal stock.

Figure 7:
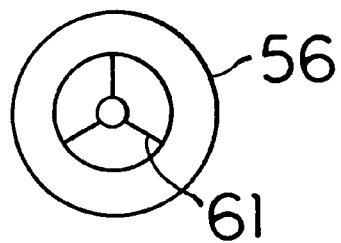
FIG. 7 is a plain elevation taken from the top of the grind adjustment knob removed from the pepper mill of FIG. 5.

The adjustment knob depicted in FIGS. 5 & 7 is readily machined on a lathe or cast if metal is desired. This and many other components may be molded in plastic if desired. Only the rotor shafts, grinding stators 43, and the grinding surfaces of the rotors 13 must be metal and steel is strongly recommended for obvious reasons. It is suggested that an oil impregnated ball bearing 52 be disposed between the power gear 34 and the axially aligned reduction gears 33 coupled to the drive gear 32 as shown in FIG. 4 in order to maintain positioning. The spur gears 31 are positioned by the bushings 39 which are each preferably comprised of a linear oil impregnated bearings. The offset pair of coupled small and large reduction gears 33 must also be supported and a horizontal support possessing the same elevation as the ball bearing 52 further possessing a bushing about the shaft between these two reduction gears 33 is recommended for this purpose.

The power switch 15 depicted in FIG. 5 is simply depressed in operation and is spring biased outward to the 'off' position in which an open circuit is obtained. It is recommended that an 'on while held' position be obtained at a first level of depression and that a 'continuous on' position be obtained with a second level of depression. Any combination of an 'off' and an 'on' positions will suffice, however, as mentioned earlier in connection with the other types of power switches 15 discussed.

Figure 6:
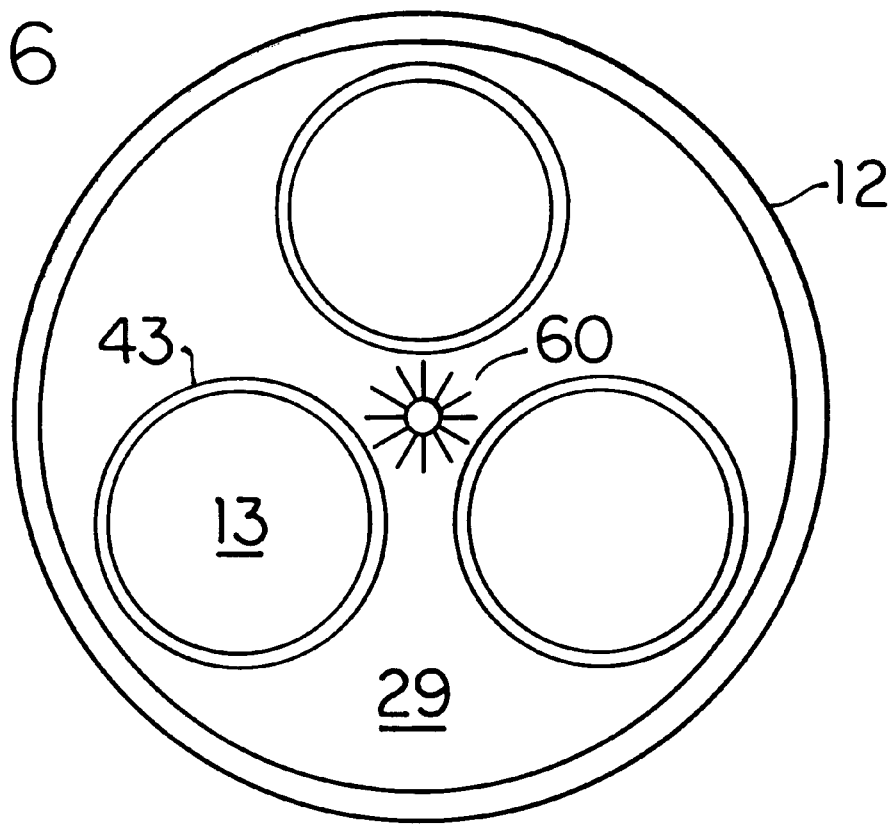
FIG. 6 is a plain elevational view taken from the bottom of the pepper mill of FIG. 5 with the grind adjustment knob removed.

The maintenance of the grind selected with the grind adjustment knob 56 utilized in the mill 10 depicted in FIG. 5 is effected with opposed radial notches 60 and projecting stiles 61 depicted in FIGS. 6 & 7, respectively. The radial notches 60 are preferably located on the bottom 29 of the lower portion 12 of the mill 10 and the radial stiles 61 upon the bottom of the adjustment knob 56 as depicted to facilitate machining. Opposed detents of other shapes and configurations may be utilized to achieve essentially the same function. A circular pattern of opposed concave and convex projections may be utilized, for example, but the radial notches 60 and stiles 61 are considered to make good use of the limited space available while providing extremely close registration between positions and hence a substantially continuous grind adjustment. The arrangement depicted in FIGS. 6 & 7 provides twelve different rotational positions, i.e. every thirty degrees. Combined with a relatively fine threading of the adjustment knob 56 and lower end of the compression rod 55 a substantially continuous grind adjustment with good resistance to drifting is achieved.

Many deviations from the particular construction suggested may be followed. Thermoset plastic or thermoplastic may be utilized as earlier mentioned in order to reduce expense in manufacture though metal is preferred for better durability. It is primarily intended that a mill 10 in accordance with the present invention be utilized in restaurant and other high volume kitchens where hard use is expected. Particulars such as the use of a toggle clamp 44 tightened cincture 54 for securing the adjustment of grind selected may be replaced by a functional equivalent such as use of a set screw or a lock ring threaded onto a handle 14 of the adjustment ring 49 which will contact the exterior of the lower portion 12 of the mill 10. The supply hopper cover 17 might comprise the entire upper surface of the lower portion 12 of the mill 10 and possess peripheral threading for removable attachment. A hinged or horizontally pivoting supply hopper cover 17 might also be used. Conventional batteries might be used rather than rechargeable battery 45 or the mill 17 might be manually driven in which case reduction gears 33 as well as the motor 35 and a battery 45 are obviously unnecessary. In this latter case the drive gear 32 would simply be coupled by a long vertical shaft to the head cap 16 which, in this case, would be rotationally displaceable with respect to the upper portion 12 of the mill 10 as in a conventional pepper mill. The long vertical shaft would, in this case, possess at least one pair of opposed flats contacting opposed flat internal surfaces of the head cap 16 and might extend upward through the head cap 16 to terminate in a threaded end for fastening with a nut in a construction similar to this portion of a conventional pepper mill as described earlier.

The above discussion in detail is intended to provide one practiced in the art with what is considered to be the best known manner of making and using a hand held rotary pepper mill 10 in accordance with the principles relating to the present invention and is not to be misconstrued in any manner as being restrictive of the scope of the present invention or of the rights and privileges conveyed by Letters Patent for the same for which I claim:

1. A hand held rotary mill, primarily intended for grinding peppercorns, which is further intended to reduce the time consumed in comminuting fluent solid material by increasing the rate of grinding relative to a conventional hand held mill possessing a single manually driven grinding rotor, said mill comprising:

a supply hopper, a plurality of gears including a drive gear and more than one spur gear, an upper portion possessing means of imparting rotational shaft power to said drive gear, a lower portion possessing more than one pair of opposed grinding rotor and grinding stator spaced apart from each other a distance suitable to grinding peppercorns therebetween;

said supply hopper being located above each said pair of opposed grinding rotor and grinding stator and possessing inclined surfaces directing fluent solid material within said supply hopper to each said pair of opposed grinding rotor and grinding stator;

each said spur gear being coupled by a rotor shaft to one said grinding rotor and engaged by said drive gear such that rotational shaft power imparted to said drive gear imparts rotational shaft power to each said spur gear thereby imparting rotational shaft power to each said grinding rotor simultaneously;

each said pair of opposed grinding rotor and grinding stator being capable of grinding peppercorns gravity fed by said supply hopper when each said grinding rotor is simultaneously driven by rotational power imparted thereto whereby pepper is ground by each said pair of opposed grinding rotor and grinding stator and ground pepper from all said opposed pairs of grinding rotor and grinding stator is emitted from a bottom of said lower portion.

2. The hand held rotary mill of claim 1 further possessing a supply hopper cover manually displaceable from a closed position to an open position exposing said supply hopper.

3. The hand held rotary mill of claim 2 wherein said supply hopper cover is rotationally displaceable.

4. The hand held rotary mill of claim 3 wherein said supply hopper cover is biased in a closed position by a spring.

5. The hand held rotary mill of claim 4 further possessing a spring loaded pivoted dog held flush with rotational displacement of said supply hopper cover which is biased outward when cleared by said supply hopper cover into a position making contact with said supply hopper cover and maintaining the same in an open position.

6. The hand held rotary mill of claim 1 wherein said grinding stators are fixed to a substantially horizontal plate with respect to a longitudinal axis of said mill.

7. The hand held rotary mill of claim 6 wherein said substantially horizontal plate is rotationally fixed, vertically displaceable, and possesses a plurality of radially inclined surfaces each biased into contact with an opposed radially inclined surface possessed of a substantially horizontal ring which is vertically fixed, rotational displaceable, and possesses at least one fixed handle which is manually displaceable; rotational displacement of said substantially horizontal ring in one direction decreasing said distance between said opposed pairs of grinding rotor and grinding stator, rotational displacement of said substantially horizontal ring in an opposed direction increasing said distance between said opposed pairs of grinding rotor and grinding stator.

8. The hand held rotary mill of claim 7 further possessing locking means for fixing the rotational orientation of said substantially horizontal ring including a toggle clamp connected to at least one said handle tightening a cincture about said lower portion when closed.

9. The hand held rotary mill of claim 1 wherein said means of imparting rotation to said drive gear possessed of said upper portion includes an electric motor electrically connected to a battery through a power switch possessing an 'off' position which places said electric motor in an open circuit with respect to said battery and at least one 'on' position which places said electric motor in a closed circuit with respect to said battery.

10. The hand held rotary mill of claim 9 wherein said power switch is spring biased into said 'off' position.

11. The hand held rotary mill of claim 9 wherein said power switch possesses an 'on while held' position obtained by displacement of said power switch.

12. The hand held rotary mill of claim 9 wherein said power switch possesses a 'continuous on' position obtained by manual displacement of said power switch.

13. The hand held rotary mill of claim 9 wherein said battery is rechargeable.

14. The hand held rotary mill of claim 13 further including electrical contacts mating electrical contacts possessed by a docking station further possessing an A.C. to D.C. transformer and an A.C. plug.

15. The hand held rotary mill of claim 14 wherein said electrical contacts are located upon a head cap extending outward from a top of said upper portion and said mill further possesses a bottom which fits into a seat of said docking station.

16. The hand held rotary mill of claim 10 wherein said electric motor possess a given rotational speed and said mill further possesses reduction gears effecting a reduction in the rotational speed of the rotational power imparted to said drive gear with respect to said given rotational speed of said electric motor.

17. The hand held rotary mill of claim 16 wherein said reduction gears are planetary.

18. The hand held rotary mill of claim 1 possessing a compression rod, an adjustment knob, said compression rod having a threaded lower end to which said adjustment knob mates, a coil spring biasing said grinding stators against said adjustment knob mated with said threaded lower end of said compression rod.

19. The hand held rotary mill of claim 18 wherein said adjustment knob and said bottom of said mill possess opposed projections and depressions congruent to each other which resist rotational displacement of said adjustment knob with respect to said bottom of said mill.

20. The hand held rotary mill of claim 19 wherein opposed projections are comprised of radial stiles and said depressions are comprised of radial notches.

* * * * *